(12) United States Patent
Furukawa et al.

(10) Patent No.: US 6,945,392 B2
(45) Date of Patent: Sep. 20, 2005

(54) GAS-VENTING CONTAINER

(75) Inventors: Shizuka Furukawa, Ashiya/Hyogo (JP); Yukio Nanno, Kobe (JP)

(73) Assignee: The Procter & Gamble Company, Cincinnati, OH (US)

(*) Notice: Subject to any disclaimer, the term of this patent is extended or adjusted under 35 U.S.C. 154(b) by 299 days.

(21) Appl. No.: 10/102,186

(22) Filed: Mar. 20, 2002

(65) Prior Publication Data

US 2003/0178329 A1 Sep. 25, 2003

(51) Int. Cl.⁷ .............................................. B65D 81/28
(52) U.S. Cl. ..................... 206/213.1; 383/102; 383/100
(58) Field of Search ........................ 206/213.1, 524.1, 206/524.2, 524.4; 383/100, 102, 103

(56) References Cited

U.S. PATENT DOCUMENTS

| | | | |
|---|---|---|---|
| 3,503,497 A | * 3/1970 | Riely et al. ................. 206/365 |
| 4,404,241 A | * 9/1983 | Mueller et al. ............. 383/103 |
| 4,579,223 A | * 4/1986 | Otsuka et al. .............. 206/204 |
| 4,856,650 A | * 8/1989 | Inoue ........................... 206/204 |
| 4,884,694 A | * 12/1989 | Sengewald ................ 206/484.1 |
| 2001/0049001 A1 | * 12/2001 | Mueller ....................... 428/138 |

* cited by examiner

Primary Examiner—David T. Fidei
(74) Attorney, Agent, or Firm—Brent M. Peebles; Jeffrey V. Bamber; Kim William Zerby

(57) ABSTRACT

A container includes a housing for containing an $O_2$-generating composition. The housing includes a venting layer and a structural layer associated with the venting layer. The venting layer has a venting layer $O_2$ passage rate and a venting layer surface area, while the structural layer has a structural layer $O_2$ passage rate and a structural layer surface area. The venting layer $O_2$ passage rate is greater than the structural layer $O_2$ passage rate, and the structural layer surface area is less than the venting layer surface area. Alternatively, the structural layer may include a plurality of apertures and a patch associated with each aperture, instead of a venting layer. Each patch has a patch $O_2$ passage rate and the total $O_2$ passage rate of the container includes the sum of each patch $O_2$ passage rate. The total $O_2$ passage rate is at least about 0.2 L/(m2*24 hours).

10 Claims, 2 Drawing Sheets

US 6,945,392 B2

GAS-VENTING CONTAINER

FIELD OF THE INVENTION

The present invention relates to containers. Specifically, the present invention relates to containers for holding an $O_2$-generating composition.

BACKGROUND OF THE INVENTION

Compositions containing oxygen bleaches, such as peroxides and peracids, have recently become very popular for cleaning clothes, cleaning fabrics, removing mildew, etc. Oxygen bleaches are preferable because of their low odor and safety on colored fabrics, as compared to hypochlorite-based bleaches. But, oxygen bleaches also suffer from problems such as peracid/peroxide decomposition which generates $O_2$ gas during shipping and storage. This is especially likely when an oxygen bleach is included in a liquid composition. This $O_2$ gas, in turn, may increase the internal pressure in the container, especially an air-tight container, and cause bulging, or eventual rupture of the container.

This problem has been addressed by forming containers which allow $O_2$ gas to pass through a venting mechanism, such as a valve. Such a venting mechanism allows gases to pass through, while liquids and solids are retained in the container. However, such containers and/or the venting mechanism may be difficult or expensive to form.

Alternatively, certain plastics and polymers may permit the gas to pass directly though the material itself. Thus, the container itself may be formed of such a gas-venting material. Containers formed of a laminate of gas-venting materials are known. However, in such cases, the container may not be sufficiently structurally sound to withstand shipping and storage conditions, and may be easily punctured or ruptured. Typically, there is a trade-off between structural stability and the rate at which a gas, such as $O_2$, passes through a container. As the structural stability increases, the density of the gas-venting container material increases as well. This in turn, reduces the gas passage rate. Accordingly, the typical container is either structurally stable, and requires an expensive venting or valve mechanism, or has an acceptable gas passage rate, but remains easily punctured or ruptured.

Accordingly, the need exists for a container which provides improved $O_2$ venting characteristics, while possessing increased resistance to punctures and ruptures. The need also exists for a container which provides the above advantages, and is inexpensive to produce.

SUMMARY OF THE INVENTION

The present invention relates to a container which includes a housing for containing an $O_2$-generating composition. The housing includes a venting layer and a structural layer associated with the venting layer. The venting layer has a venting layer $O_2$ passage rate and a venting layer surface area, while the structural layer has a structural layer $O_2$ passage rate and a structural layer surface area. The venting layer $O_2$ passage rate is greater than the structural layer $O_2$ passage rate, and the structural layer surface area is less than the venting layer surface area.

In another aspect, the present invention also relates to a container which includes a housing for containing an $O_2$-generating composition. The housing includes a structural layer including a plurality of apertures and a patch associated with each aperture. Each patch has a patch $O_2$ passage rate and the total $O_2$ passage rate of the container includes the sum of each patch $O_2$ passage rate. The total $O_2$ passage rate is at least about 0.2 $L/(m^2*24$ hours).

It has now been found that a container which relies upon a structural layer to provide stability may rely on a different layer, such as a venting layer, or a patch to allow gas to escape from the container. While the present invention is applicable to all types of $O_2$-generating compositions, whether they be in solid form, liquid form, or gel forms, such a container is especially useful for holding and storing a liquid $O_2$-generating composition such as a liquid oxygen bleach. Such a container easily holds such a liquid composition without leakage, while allowing $O_2$ gas to be released. This reduces or avoids $O_2$ gas build-up and/or bulging of the container during, for example, shipping and storage. The container herein may also be more resistant to punctures, and cheaper to produce.

These and other features, aspects, advantages, and variations of the present invention, and the embodiments described herein, will become evident to those skilled in the art from a reading of the present disclosure with the appended claims, and are covered within the scope of these claims.

BRIEF DESCRIPTION OF THE DRAWINGS

While the specification concludes with claims particularly pointing out and distinctly claiming the invention, it is believed that the invention will be better understood from the following description of preferred embodiments which is taken in conjunction with the accompanying drawings in which:

DETAILED DESCRIPTION OF THE INVENTION

All documents cited are incorporated herein by reference in their entireties. Citation of any reference is not an admission regarding any determination as to its availability as prior art to the claimed invention. The drawings herein are not necessarily drawn to scale.

As used herein, the term "alkyl" means a hydrocarbyl moiety which is straight or branched, saturated or unsaturated. Unless otherwise specified, alkyl moieties are preferably saturated or unsaturated with double bonds, preferably with one or two double bonds. Included in the term "alkyl" is the alkyl portion of acyl groups.

Figure 1:
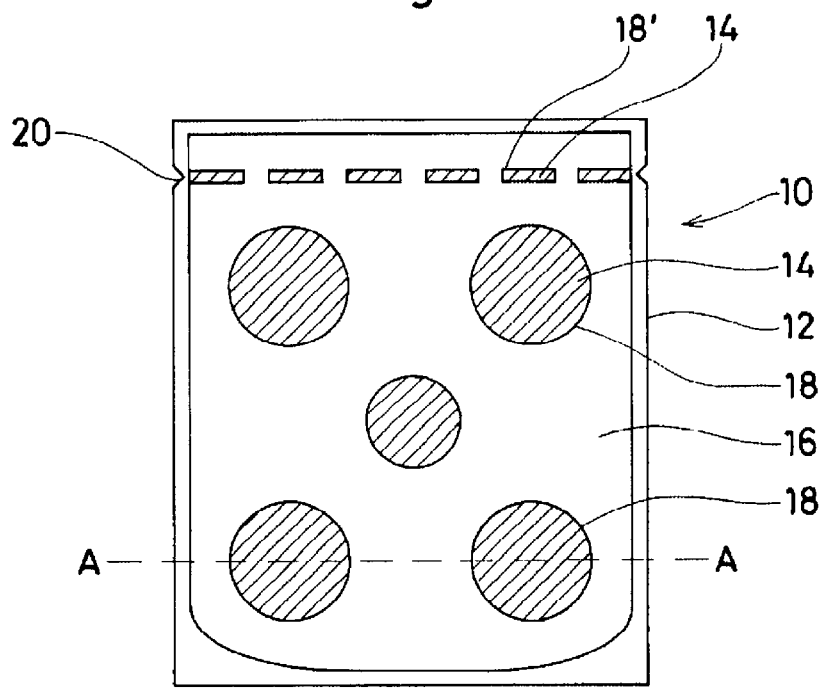
FIG. 1 is a side view of a preferred embodiment of the container of the present invention.

Referring to the drawings, FIG. 1 shows a side view of a preferred embodiment of the container of the present invention. The container, 10, has a housing, 12, for containing an $O_2$-generating composition. The housing, 12, has a venting layer, 14, and a structural layer, 16, associated with the venting layer, 14. It is essential that when the housing, 12, is sealed, such as during shipping and storage, the venting layer, 14, and/or the structural layer, 16, must not allow the $O_2$-generating composition within the container to prematurely escape from or otherwise leak from the container, 10.

The venting layer, 14, is formed of a film, a laminate, and/or a thin layer of plastic which allows $O_2$ to pass through the venting layer, while keeping the $O_2$-generating composition within the housing, 12. Accordingly, the venting layer has a venting layer surface area, and a venting layer $O_2$ passage rate which is dependent upon the venting layer material, the thickness of the venting layer, the permeable surface area of the venting layer, and the difference in $O_2$ partial pressure between opposite sides of the venting layer. The venting layer is impermeable to the $O_2$-generating composition contained within the housing, but is permeable to the $O_2$ generated thereby.

The venting layer $O_2$ passage rate may be found in standard texts (see *Manufacturing Method of High-barrier Property Packaging Material and Design, Manufacturing Technology and Usage Expansion*, p. 7, published by the Technical Information Association (Gijutsu Jouhou Kyoukai) of Tokyo, Japan, (Sep. 28, 1998)), and/or may be calculated according to the following formula:

$$Q=(P*A)/T \quad \text{(Formula I)},$$

where Q is the $O_2$ gas permeation rate in $L/(m^2*24 \text{ hours})$ at 1 atmosphere pressure. P represents the permeation coefficient which is dependent upon the type of gas, the thickness and type of material, etc. Values for P may be found in the literature and in standard texts. P has the units $L/(m*24 \text{ hours})$. In Formula I, A represents the permeable area in square meters, while T represents the thickness of the material in meters. The permeable area, A, is also dependent upon the fill level of the $O_2$-generating composition within the container. Without intending to be limited by theory, it is believed that as $O_2$ gas is generated, it rises to the highest point of the container, and then escapes from this highest point. This is especially true for a liquid $O_2$-generating composition, as it is thought that the $O_2$ passage rate is negligible in areas of the container which are covered by liquid. Thus, in a preferred embodiment, the permeable area, A, is measured as the area of the venting layer, 14, and/or patch (see FIG. 4 at 24) which does not contact the liquid $O_2$-generating composition at the typical fill level. Accordingly, for such liquid $O_2$-generating compositions, it is important that during shipping and/or storage, the container be filled with the liquid $O_2$-generating composition to a maximum of about 95%, preferably from about 70% to about 95%, and more preferably from about 75% to about 90% of the total volume of the container.

The venting layer $O_2$ passage rate useful herein must be greater than the $O_2$ gas evolution rate of the $O_2$-generating composition. In practice, the venting layer $O_2$ passage rate is at least about 0.06 $L/(m^2*24 \text{ hours})$, preferably from about 0.2 to about 20 $L/(m^2*24 \text{ hours})$, more preferably from about 0.5 to about 10 $L/(m^2*24 \text{ hours})$. The venting layer is typically from about 10 $\mu$m to about 5 mm thick, preferably from about 10 $\mu$m to about 1 mm thick, more preferably form about 10 $\mu$m to about 300 $\mu$m thick, and even more preferably from about 20 $\mu$m to about 200 $\mu$m thick.

Preferably the venting layer comprises a material selected from the group consisting of polyethylene, polypropylene, ethyl-vinyl-acetate, polystyrene, polycarbonate, poly-4-methylpentene-1, a microporous membrane, and combinations thereof; more preferably, the venting layer comprises a material selected from the group consisting of a linear low-density polyethylene, an oriented polypropylene, and combinations thereof. Suitable venting layer materials are available from 3M Company (St. Paul, Minn., USA), Du Pont Co. (Wilmington, Del., USA), Toppan Insatsu Co. (Tokyo, Japan), and Gelman Sciences Company (Ann Arbor, Mich., USA).

The structural layer, 16, provides the container with sufficient structural integrity such that it is not easily punctured, ruptured, and/or otherwise opened so as to allow the contents therein to leak or spill out before the user purposely opens the container. However, as the container is preferably a pouch-type container, this structural layer is preferably formed of a flexible material such as a film, a laminate, and/or a thin plastic layer. Materials which satisfy these criteria include nylon, polyethylene, polypropylene, ethyl-vinyl-acetate, polystyrene, polycarbonate, poly-4-methylpentene-1, and combinations thereof; more preferably, the structural layer comprises nylon. Suitable structural layer materials are available from, for example, 3M Company (St. Paul, Minn., USA), Du Pont Co. (Wilmington, Del., USA), Toppan Insatsu Co. (Tokyo, Japan), and Gelman Sciences Company (Ann Arbor, Mich., USA).

The structural layer has a structural layer surface area, and a structural layer $O_2$ passage rate. The structural layer $O_2$ passage rate may be found in standard texts, or calculated according to the formula, above. The venting layer $O_2$ passage rate is greater than the structural layer $O_2$ passage rate. According to Formula I, the structural layer $O_2$ passage rate useful herein is less than about 0.06 $L/(m^2*24 \text{ hours})$, preferably from about 0 to about 0.06 $L/(m^2*24 \text{ hours})$, more preferably from about 0 to about 0.01 $L/(m^2*24 \text{ hours})$. The structural layer is typically from about 10 $\mu$m to about 5 mm thick, preferably from about 10 $\mu$m to about 1 mm thick, more preferably form about 10 $\mu$m to about 300 $\mu$m thick, and even more preferably from about 20 $\mu$m to about 200 $\mu$m thick.

In FIG. 1, it can be seen that the venting layer, 14, is associated with, and partially covered by the structural layer, 16, to form the housing, 12. In this preferred embodiment, the venting layer, 14, is located in the interior of the housing, 12, while the structural layer, 16, is located on the exterior of the housing, 12 (see also FIG. 3). However, this is not necessarily the case, as the structural layer and the venting layer may be associated in virtually any order or alignment. The venting layer and the structural layer are typically formed as separate layers, and then associated by joining them together, either permanently or temporarily, by one or more methods known in the art. The venting layer and the structural layer are preferably joined together by a method selected from the group consisting of laminating, heat sealing, ultrasonic sealing, gluing, pressure sealing, and combinations thereof. Multiple venting layers having multiple venting layer surface areas and/or multiple venting layer $O_2$ passage rates may also be useful herein.

In FIG. 1, the venting layer, 14, may be seen through one or more apertures, 18, in the structural layer, 16. The apertures, 18, represent physical holes or openings in the structural layer, 16, which allow $O_2$ to pass through in a substantially unimpeded manner. The apertures, 18, in the structural layer, 16, are sealed by the venting layer, 14, which prevents the $O_2$-generating composition from prematurely escaping. Preferably, the structural layer contains a plurality of apertures therein, more preferably the structural layer contains from about 2 to about 40 apertures therein. Preferably, the aperture is large enough to be seen by the naked eye, more preferably the apertures form a pattern, logo, trademark, or design which allows a consumer to easily identify the container. The apertures may, or may not be arranged in a regular pattern (see FIG. 3), as desired.

In a highly preferred embodiment, as shown in FIG. 1, the apertures at 18', form a line or a structurally weak point which allows a consumer to easily tear, cut, and/or open the container at that point. Such apertures, 18', may also serve as one or more indicators of where the container should be torn, cut, and/or opened. FIG. 1 also shows a notch, 20, which facilitates such tearing, cutting, and/or opening of the container, 10.

In FIG. 1, it can be seen that certain areas of the venting layer, 14, are exposed by the apertures, 18, in the structural layer, 16. In an embodiment of the present invention, the venting layer surface area is greater than the structural layer surface area, such that portions of the venting layer are not covered by the structural layer. Thus, the total $O_2$ passage rate from the interior of the container to the exterior of the container is essentially determined by the difference between the venting layer surface area and the structural layer surface area. Thus, in Formula I, the permeable area, A, is found by adding up the total area of the apertures, 18. In a preferred embodiment, the structural layer surface area is less than about 90% of the venting layer surface area, more preferably the structural layer surface area is about 50% to about 90% of the venting layer surface area, and even more preferably the structural layer surface area is about 70% to about 85% of the venting layer surface area. Multiple structural layers having the same, or different structural layer surface areas and/or multiple structural layer $O_2$ passage rates may also be useful herein.

Figure 2:
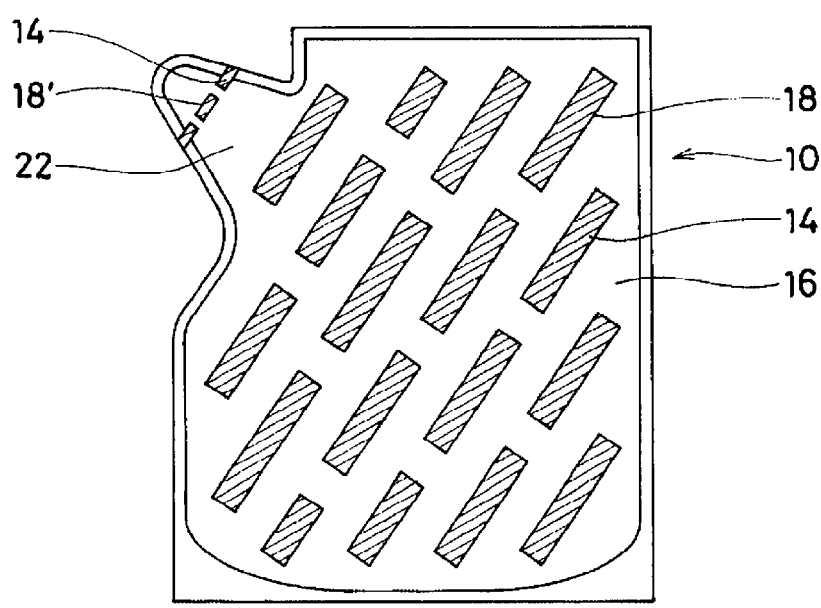
FIG. 2 is a side view of a preferred embodiment of the container of the present invention, with a spout.

FIG. 2 shows a side view of a preferred embodiment of the present invention, which contains a spout, 22. The spout, 22, allows a consumer to easily and neatly pour the $O_2$-generating composition once the container, 10, is opened. In FIG. 2, a line of apertures, 18', is provided, along which the container, 10, may be opened in order to allow the $O_2$-generating composition to pour out via the spout, 22. As with FIG. 1, the venting layer, 14, is partially covered by the structural layer, 16. Apertures, 18, are present, in the structural layer, 16, through which the venting layer, 14, may be seen.

Figure 3:
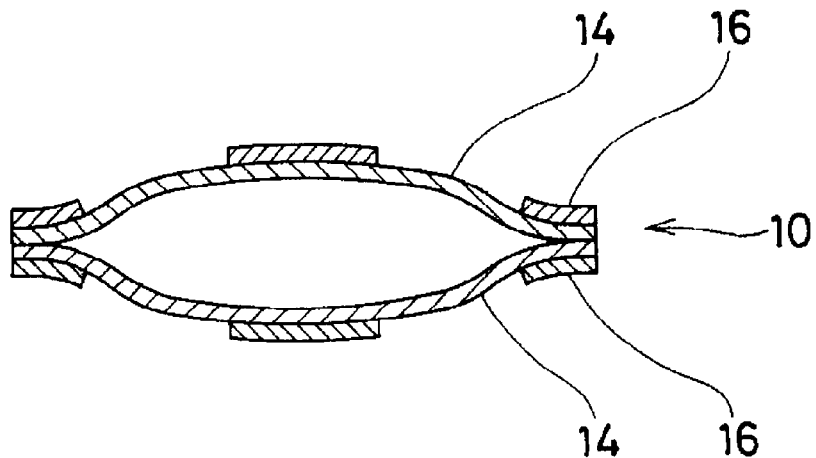
FIG. 3 is a cross-sectional view of the container of FIG. 1 along line A—A.

FIG. 3 is a cross-sectional view of the container of FIG. 1 along line A—A. In this embodiment of the present invention, the venting layer, 14, is continuous, and lines the entire interior of the container, 10, which contacts the $O_2$-generating composition. Two venting layers, 14, are sandwiched between the two structural layers, 16, to form the container, 10.

Figure 4:
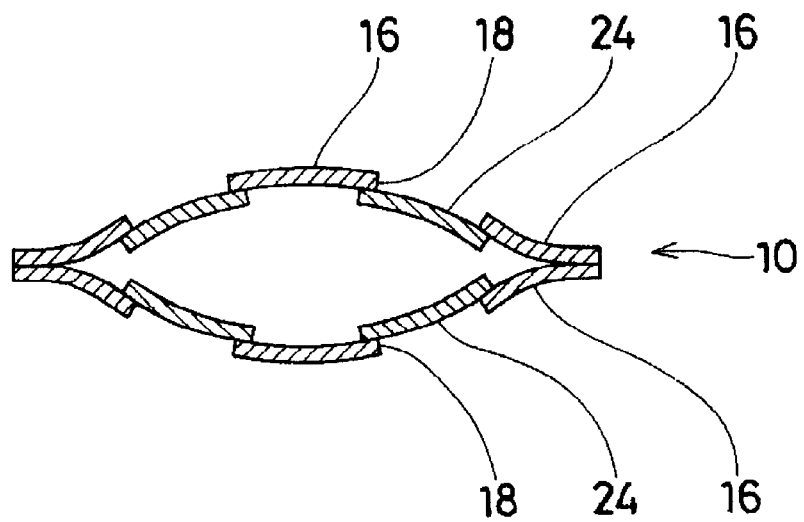
FIG. 4 is a cross-sectional view of a preferred embodiment of the container of the present invention.

FIG. 4 is a cross-sectional view of a container, 10, which shows an alternative embodiment of the present invention. Instead of a continuous venting layer, as seen in FIG. 3 at 14, the embodiment of FIG. 4 contains a patch, 24, to plug each aperture, 18. From the exterior of the container, 10, this embodiment looks the same as the container shown in FIG. 1. Specifically in this embodiment, the structural layer contains at least one aperture, 18, therein, and a patch, 24, corresponding to each aperture, 18. The patch, 24, is associated with and seals the corresponding aperture, 18. Thus, the patch, 24, prevents the $O_2$-generating composition from prematurely escaping, or leaking from the corresponding aperture, 18.

As with the venting layer (see FIG. 1, at 14), each patch, 24, must allow $O_2$ gas to pass through, so as to avoid bulging or rupture of the container. Therefore, each patch has a patch $O_2$ passage rate, which may be found in the literature, or calculated according to the formula, above. The total $O_2$ passage rate is the sum of each patch $O_2$ passage rate, and is at least about 0.06 L/(m²*24 hours), preferably from about 0.2 to about 20 L/(m²*24 hours), more preferably from about 0.5 to about 10 L/(m²*24 hours). The patch may be formed of any of the materials described above, for the venting layer. Similarly, the patch may be associated and/or sealed to the structural layer via any of the methods described above for associating and sealing the venting layer to the structural layer.

In an embodiment of the present invention (not shown), the container has at least one structural layer which has a plurality of apertures therein. Associated with the structural layer are both at least one venting layer and a plurality of patches.

In a preferred embodiment (not shown), the container is constructed as a stand-up container, meaning that the venting layer and/or the structural layer impart the container with sufficient structural integrity to prevent the filled container form collapsing when placed upright on a flat surface. In a more preferred embodiment, the container is constructed as a stand-up pouch whose venting layer and structural layer remain flexible. Typically, to form such a stand-up pouch, three pieces of housing material are used. A first piece of housing material forms the front of the container, a second piece of housing material forms the back of the container, and a third piece of housing material forms the bottom of the container. Other methods for constructing the container and a stand-up pouch are also useful herein.

In a preferred embodiment, the apertures are evenly distributed across the container, so that the total $O_2$ passage rate is substantially consistent, regardless of the orientation of the container.

In a preferred embodiment, the $O_2$-generating composition is an oxygen bleach composition. The oxygen bleach composition typically comprises therein an oxygen source such as hydrogen peroxide, a peracid and/or per-salt, or a mixture thereof, more preferably hydrogen peroxide, an alkali metal percarbonate, an alkali metal perborate, a peroxidase enzyme, or a mixture thereof. The oxygen bleach composition also typically comprises therein other optional ingredients, such as a surfactant, a chelant, a buffering system, and combinations thereof.

Preferred surfactants useful herein include anionic surfactants, nonionic surfactants, cationic surfactants, amphoteric surfactants, and combinations thereof. Combinations of anionic surfactants, amphoteric surfactants, and nonionic surfactants are especially preferred. Nonlimiting examples of the surfactant useful in the detergent composition include, the conventional $C_{11}$–$C_{18}$ alkyl benzene sulfonates and primary, branched-chain and random $C_{10}$–$C_{20}$ alkyl sulfates, the $C_{10}$–$C_{18}$ secondary (2,3) alkyl sulfates of the formula $CH_3(CH_2)_x(CHOSO_3^-M^+)CH_3$ and $CH_3 (CH_2)_y (CHOSO_3^{-M+}) CH_2CH_3$ where x and (y+1) are integers of at least about 7, preferably at least about 9, and M is a water-solubilizing cation, especially sodium, unsaturated sulfates such as oleyl sulfate, the $C_{10}$–$C_{18}$ alkyl alkoxy sulfates (especially EO 1-7 ethoxy sulfates), $C_{10}$–$C_{18}$ alkyl alkoxy carboxylates (especially the EO 1-5 ethoxycarboxylates), the $C_{10}$–$C_{18}$ glycerol ethers, the $C_{10}$–$C_{18}$ alkyl polyglycosides and their corresponding sulfated polyglycosides, and $C_{12}$–$C_{18}$ alpha-sulfonated fatty acid esters. If desired, the conventional nonionic and amphoteric surfactants such as the $C_{12}$–$C_{18}$ alkyl ethoxylates including the so-called narrow peaked alkyl ethoxylates and $C_6$–$C_{12}$ alkyl phenol alkoxylates (especially ethoxylates and mixed ethoxy/propoxy), $C_{12}$–$C_{18}$ betaines and sulfobetaines, $C_{10}$–$C_{18}$ amine oxides, and the like, can also be included in the overall compositions. The $C_{10}$–$C_{18}$ N-alkyl polyhydroxy fatty acid amides can also be used. Typical examples include the $C_{12}$–$C_{18}$ N-methylglucamides. See WO 92/06154 to Cook, et al., published Apr. 16, 1992. Other sugar-derived surfactants include the N-alkoxy polyhydroxy fatty acid amides, such as $C_{10}$–$C_{18}$ N-(3-methoxypropyl) glucamide. The N-propyl through N-hexyl $C_{12}$–$C_{18}$ glucamides can be used for low sudsing. $C_{10}$–$C_{20}$ conventional soaps may also be used.

Highly preferred nonionic surfactants include the Dobonol series from Shell Chemical Co. (Houston, Tex., USA). The $O_2$-generating composition typically comprises at least about 0.01%; more preferably at least about 0.1%; more preferably at least about 1%; more preferably still, from about 1% to about 55% of a surfactant.

A chelant is useful herein to reduce degradation of the oxygen source which may be catalyzed by trace amounts of metal ions. Chelants especially useful herein include 1-hydroxyehylidene-1,1-diphosphonic acid, butylated hydroxy toluene, ethylene diamine tetra acetate, ethylenediamine disuccinate, and mixtures thereof. The $O_2$-generating composition typically comprises from about 0.1% to about 15%, more preferably 0.1% to about 3% of a chelant.

The buffering system useful herein maintains the pH of a liquid $O_2$-generating composition at a pH where the oxygen source is relatively stable, preferably the buffering system maintains the pH of the composition at a pH of less than about 7, more preferably between about 3 and about 6.5. Buffering systems useful herein are well-known in the art. The $O_2$-generating composition typically comprises from about 0.1% to about 15%, more preferably 0.3% to about 10% of a buffering system.

Other adjunct ingredients commonly used in detergent and bleaching compositions are also useful in the $O_2$-generating composition herein. Nonlimiting examples of such adjunct ingredients include dyes, suds suppressers, alcohols, perfumes, enzymes, and mixtures thereof.

Examples of the invention are set forth hereinafter by way of illustration and are not intended to be in any way limiting of the invention.

EXAMPLE 1

A liquid oxygen bleaching composition, according to Composition A and/or Composition B, is placed into separate containers at a fill level of 90%. The container is that shown in FIG. 1, and is formed as follows. The venting layer is formed of linear low density polyethylene with a thickness of about 130 μm, and a venting layer $O_2$ passage rate of about 1.5 L/(m²*24 hours). The structural layer is formed of nylon with a thickness of about 25 μm. The nylon has a structural layer $O_2$ passage rate of about 0.03 L/(m²*24 hours). The venting layer and the structural layer are laminated together to form a bi-layer film. Three pieces of this bi-layer film are then heat-sealed around the edges to form a stand-up pouch-type container.

| Ingredients | Composition A wt % | Composition B wt % |
| --- | --- | --- |
| Sodium $c_{12-14}$ alkyl ethoxy (3x) sulphate | 18.3 | 18.3 |
| $C_{12-14}$ alkyl glucose amide | 8.1 | 8.1 |
| $C_{12-14}$ alcohol ethoxylate (5x) | 16.8 | 16.8 |
| Butoxy propoxy propanol | 14.3 | 14.3 |
| Quaternized polyethoxylated hexamethylene diamine chloride salt | 2 | 2 |
| Acetyl triethyl citrate | 10.4 | 10.4 |
| Sodium carbonate | 8 | 8 |
| Percarbonate | 10 | 0 |
| Perborate | 0 | 10 |
| Water & minors | balance | balance |

Both sodium carbonate, percarbonate and perborate are suspended as solid components in this liquid $O_2$-generating composition.

EXAMPLE 2

| | Composition C | Composition D | Composition E | Composition F |
| --- | --- | --- | --- | --- |
| $H_2O_2$ | 5.7 | 5.7 | 6.8 | 6.8 |
| Dobanol 23-3 | 2.0 | 2.0 | 1.0 | 1.5 |
| Dobanol 45-7 | 1.6 | 1.6 | | |
| Dobanol 23-6.5 | | | 3.0 | |
| Dobanol 91-10 | | | | 1.6 |
| $C_{12}$ alkyl betaine salt | 2.5 | 2.5 | 2.0 | |
| $C_{10}$ fatty alkyl sulfate | | | | 1.7 |
| HEDP† | 0.16 | 0.16 | 0.16 | 0.16 |
| BHT†† | 0.10 | 0.07 | 0.07 | |
| Citric Acid | 0.50 | 0.50 | 0.50 | |
| Water & minors | balance | balance | balance | balance |
| pH | 5.0 | 5.0 | 5.0 | 4.0 |

†1-hydroxyehylidene-1,1-diphosphonic acid
††butylated hydroxy toluene

The liquid oxygen bleaching compositions C-F are placed into separate stand-up pouches as are described in Example 1, at a fill level of 90%.

What is claimed is:

1. A container comprising a housing, said housing containing an $O_2$-generating composition, the housing comprising a venting layer and a structural layer associated with the venting layer, the venting layer having a venting layer $O_2$ passage rate, and a venting layer surface area, and the structural layer having a structural layer $O_2$ passage race, and a structural layer surface area, wherein the venting layer $O_2$ passage rate is greater than the structural layer $O_2$ passage rate, and wherein the structural layer surface area is less than the venting layer surface area.

2. The container of claim 1, wherein the container is a stand-up container.

3. The container of claim 1, wherein the structural layer surface area is less than about 90% of the venting layer surface area.

4. A container comprising a housing for containing an $O_2$-generating composition, the housing comprising a venting layer and a structural layer associated with the venting layer, the venting layer having a venting layer $O_2$ passage rate of at least about 0.06 L/(m²*24 hours), and a venting layer surface area, and the structural layer having a structural layer $O_2$ passage rate, and a structural layer surface area, wherein the venting layer $O_2$ passage rate is greater than the structural layer $O_2$ passage rate, and wherein the structural layer surface area is less than the venting layer surface area.

5. The container of claim 1, wherein the $O_2$-generating composition is a liquid $O_2$-generating composition.

6. The container of claim 1, wherein the venting layer comprises a material selected from the group consisting of polyethylene, polypropylene, ethyl-vinyl-acetate, polystyrene, polycarbonate, poly-4-methylpentene-1, a microporous membrane, and combinations thereof.

7. The container of claim 5, wherein the liquid $O_2$-generating composition is a liquid oxygen bleach composition.

8. A container comprising a housing for containing an $O_2$-generating composition, the housing comprising a structural layer, the structural layer comprising at least one aperture and a patch associated with each aperture, each patch having a patch $O_2$ passage rate, wherein the container has a total $O_2$ passage rate, wherein the total $O_2$ passage rate comprises the sum of each patch $O_2$ passage rate, and wherein the total $O_2$ passage rate is at least about 0.06 $L/(m^2*24\text{ hours})$.

9. The container of claim 8, wherein at least one patch comprises a material selected from the group consisting of polyethylene, polypropylene, ethyl-vinyl-acetate, polystyrene, polycarbonate, poly-4-methylpentene-1, a microporous membrane, and combinations thereof.

10. The container of claim 8, wherein the container is a stand-up container.

* * * * *